(12) United States Patent
Warner

(10) Patent No.: US 8,611,473 B1
(45) Date of Patent: Dec. 17, 2013

(54) REDUCTION OF CORRELATED CHANNEL IMPAIRMENTS

(75) Inventor: William D. Warner, Maple Ridge (CA)

(73) Assignee: PMC-Sierra, Inc., Sunnyvale, CA (US)

( * ) Notice: Subject to any disclaimer, the term of this patent is extended or adjusted under 35 U.S.C. 154(b) by 342 days.

(21) Appl. No.: 12/969,402

(22) Filed: Dec. 15, 2010

(51) Int. Cl.
*H04L 27/06* (2006.01)

(52) U.S. Cl.
USPC .......................................................... 375/340

(58) Field of Classification Search
USPC ................... 375/316, 340, 346, 348
See application file for complete search history.

(56) References Cited

U.S. PATENT DOCUMENTS

| | | | |
|---|---|---|---|
| 5,132,988 A | | 7/1992 | Fisher et al. |
| 6,192,072 B1 | | 2/2001 | Azadet et al. |
| 6,363,112 B1 | | 3/2002 | Azadet et al. |
| 7,184,477 B2 | | 2/2007 | Haunstein et al. |
| 7,292,665 B2 | * | 11/2007 | Eglit .............................. 375/355 |
| 7,489,739 B2 | * | 2/2009 | Dally ............................ 375/316 |
| 7,606,301 B2 | | 10/2009 | Aziz |
| 2004/0071247 A1 | * | 4/2004 | Dunning et al. ............... 375/355 |
| 2004/0096016 A1 | * | 5/2004 | Choudhury et al. .......... 375/340 |
| 2005/0135518 A1 | * | 6/2005 | Vallet et al. ................... 375/348 |
| 2010/0103999 A1 | * | 4/2010 | Leibowitz et al. ............ 375/348 |

OTHER PUBLICATIONS

International Committee for Information Technology Standards; Working Draft, Information Technology Serial Attached SCSI-2 (SAS-2); Apr. 18, 2009, pp. i-xlvi and 1-416; American National Standard Institute (ANSI), USA.
International Committee for Information Technology Standards; Working Draft, Information Technology Serial Attached SCSI-2 (SAS-2); Apr. 18, 2009; pp. 417-877; American National Standard Institute (ANSI), USA.

* cited by examiner

*Primary Examiner* — Betsy Deppe
(74) *Attorney, Agent, or Firm* — Knobbe Martens Olson & Bear LLP

(57) ABSTRACT

For power efficiency, it can be desirable to use a 1-bit ADC or slicer to receive a wired data transmission. A plurality of N samples per baud period are taken. N can be, for example, 4 or more. At least a portion of the samples are included in a window of samples, the size of which is based at least partly on earlier determined values of prior symbols. For example, a polynomial function or other numerical function can be embedded in a lookup table to map previously determined data bits to an address, and the address can be used to control an input of multiplexers to vary the size of the window. The value for a current symbol is determined based at least partly on one or more values within the window of samples.

28 Claims, 13 Drawing Sheets

$$x'_i = \text{filt\_en} \cdot ((x_{i-1} + x_i + x_{i+1}) > 1) + \overline{\text{filt\_en}} \cdot x_i$$

REDUCTION OF CORRELATED CHANNEL IMPAIRMENTS

BACKGROUND

1. Field of the Invention

Embodiments of the invention generally relate to electronics, and in particular, to receivers for communication links using binary non-return-to zero (NRZ) as the method of transmission and in which multiples samples per baud period are available.

2. Description of the Related Art

In any communication channel, the ability of the receiver to accurately detect the transmitted data is impacted by the presence of channel impairments. Channel impairments can include both correlated and uncorrelated sources. A common example of correlated impairment is Inter-Symbol Interference (ISI), also sometimes referred to as Data Dependent Jitter (DDJ) in some fields of communication receivers.

As the amount of ISI increases, it becomes increasingly difficult for a receiver to correctly detect the transmitted information. If the amount of ISI increases enough, techniques to mitigate at least a portion of the ISI are typically used so that the receiver can function properly.

A very common technique to mitigate ISI is to apply an equalizer to the received signal. This can be done in the analog domain or in the digital domain after suitable conversion with an analog-to-digital converter (ADC). The equalizer is typically designed to have a frequency response that is approximately equal to or the reciprocal of the channel response inducing the ISI. For example, a low pass frequency response is common in communication channels. Mitigation of the ISI induced by the low-pass response can be achieved by applying an equalizer with a corresponding reciprocal high-pass frequency response or a pre-emphasis response or by negating the impairment via subtraction with an approximately equal low-pass frequency response.

The ability to mitigate channel dependent impairments allows a receiver to tolerate an increased amount of other impairments that are not as easily mitigated.

Modern receivers in use in many different fields of communication (such as wireless, serdes, reed channels, etc.), perform an increasing amount of channel impairment mitigation in the digital domain. The received signal is sampled multiple times per baud period with an ADC having a prescribed number of sample threshold levels. Increasing the number of samples per baud taken of the signal, and/or increasing the number of threshold levels used per sample, provides increasing fidelity in the digital domain of the received analog signal. This increased fidelity allows for better and stronger ISI mitigation techniques. Those versed in the art will recognize the application of Feed-Forward Equalizers (FFE) and Decision-Feedback Equalizers (DFE), as well as more complex Maximum Likelihood Sequence Estimators (MLSE), and other techniques, for these situations.

The product of the number of samples per baud period and the number of threshold levels per sample directly affects the cost and complexity of a receiving device. Much effort by designers is devoted to reducing the number of samples per baud used and/or reducing the number of thresholds per sample. Both approaches reduce the complexity of the receiver, but make it increasingly difficult to mitigate ISI. This is particularly true when reducing the number of amplitude thresholds per sample.

To reduce complexity of a receiver, it is desirable to sample a received signal with an ADC or slicer having only a single amplitude threshold. Multiple samples per baud period are available, but each sample has one of two possible values, depending on whether the received signal is greater in amplitude or lesser in amplitude than a set threshold.

To increase the usefulness of a receiver it is desirable for the receiver to mitigate and/or tolerate an increasing amount of correlated channel impairment (e.g., ISI or DDJ). With only 1 threshold level per sample, conventional equalizer-based techniques for mitigating correlated channel impairments will not work.

Embodiments of the invention advantageously increase the amount of correlated channel impairment that can be tolerated/mitigated by a receiver having only a single amplitude threshold per sample.

Current state of the art in decision feedback equalizer processing to combat correlated channel impairments is represented by the following U.S. Pat. Nos. 5,132,988; 7,606,301; 7,184,477; 6,192,072; and 6,363,112, which are incorporated by reference in their entirety and discussed in the following:

The concept of using current and past decisions to adjust the detection and determination of subsequent symbols is well established in the current art. A decision feedback equalizer (DFE) is a well recognized form of this concept. The common theme of systems employing this technique is that the amplitude of the received signal is preserved and processed, either in analog or digital domain. Variations exist on basic concept of the DFE.

U.S. Pat. No. 5,132,988 to Fisher, et al., the linear feedback structure of the DFE is replaced with a RAM table that is addressed by the current and recent history of the determined bits.

Another DFE implementation is described in U.S. Pat. No. 7,606,301 to Aziz, in which it is recognized that the optimal sampling phase for DFE operation may be different than that provided by a non-DFE based clock and data recovery (CDR) circuit.

A DFE described in U.S. Pat. No. 7,184,477 to Haunstein, et al., adjusts the decision threshold and the sample timing for the next baud interval based on at least the previous bit decision.

In U.S. Pat. No. 6,192,072, and U.S. Pat. No. 6,363,112, both to Azadet, et al., a parallel implementation of a DFE is disclosed. Implementation in a parallel architecture allows for much higher data rates than is possible with a linear implementation.

FIG. 1 illustrates a conventional SerDes system with a transmitter (data source 102) and a receiver (data receiver 106). Those knowledgeable in the art will recognize that there are numerous variations on this basic implementation architecture. For simplicity, the description is given with the assumption of a serial implementation. The circuit of FIG. 1 illustrates a generic timing recovery mechanism that aligns the data recovery window with the sampled data stream based on recent sample data. This function is typically present in the receiver 106. The timing recovery function can be performed with a feedback loop entirely within the digital domain or by controlling the frequency of the ADC sampling clock. A feed-forward timing recovery mechanism can also be employed, although this is not shown in FIG. 1.

SUMMARY

A decision feedback adjusted timing (DFAT) circuit can be integrated with a digital receiver, which bolsters the receiver's ability to recover correct data from the received signal in the presence of a relatively large amount of correlated impairment. Without the DFAT circuit, a receiver would still be able to operate, but only in more benign channel conditions.

Advantageously, the DFAT circuit provides for substantial robustness to correlated impairment with only a modest increase in digital complexity.

Embodiments of the invention include receivers in which the number of thresholds per sample has been reduced to one. Receivers based on samplers having a single threshold level are common in applications in which the transmitted signal has only two states. Such applications include Read Channels and serializer-deserializer (SerDes). With only a single amplitude threshold per sample, commonly used ISI mitigation techniques such as FFE and DFE equalizers are often ineffective.

In SerDes communication applications, a premium is placed on the power efficiency of the SerDes link. For communication links that have low levels of impairment, there are well known architectures for achieving high power efficiency. For communication links that have moderate levels of impairment, there are well known architectures that achieve low bit error rate (BER) performance, but which are not particularly power efficient. Embodiments of the invention result in very power efficient receiver that can be used in all but the most demanding communication channel conditions.

One embodiment includes a method of detecting symbols of a data stream carried via a wired or optical transmission channel, wherein the method includes: for each baud period of the data stream: varying a size of a window of sliced samples based at least partly on determined values of one or more immediately prior symbols, wherein the window includes at least a portion of the samples of a baud period for the current symbol; and determining a value for the current symbol based at least partly on one or more values within the window of sliced samples; wherein at least varying and determining are performed by electronic hardware.

One embodiment includes an apparatus for detecting symbols of a data stream carried via a wired or optical transmission channel, wherein the apparatus includes: a data decision memory block configured to store one or more determined values of two or more immediately prior symbols; and a variable window processing block configured to, per baud period, select a size for a window of sliced samples of based at least partly on the determined values of the two or more immediately prior symbols and to determine a value for a current symbol based at least partly on one or more values within the window of sliced samples.

One embodiment includes an apparatus for detecting symbols of a data stream carried via a wired or optical transmission channel, wherein the apparatus includes: means for varying a size of a window of sliced samples for each baud period of the data stream based at least partly on determined values of two or more immediately prior symbols, wherein the window includes at least a portion of the samples of a baud period for the current symbol; and means for determining a value for the current symbol based at least partly on one or more values within the window of sliced samples.

One embodiment includes a method of adaptively adjusting or generating content for a lookup table for selection of one or more samples to be used for determination of a value of a symbol from a data stream, wherein method includes: determining offsets between an average transition locations and actual transition locations within samples, wherein the data stream is sliced at a sampling rate that is at least 4 times higher than a baud rate of the data stream; collecting offsets independently by previous detected symbol pattern when a current determined symbol is different from the determined symbol for an immediately previous baud interval, wherein the previous detected symbol pattern comprises one or more prior symbols; discarding a collected offset when the current determined symbol is the same as the determined symbol for the previous baud interval; and modifying a value associated with the collected offset in the lookup table; wherein at least determining, collecting, discarding, and modifying are performed by electronic hardware.

One embodiment includes an apparatus for adaptively adjusting or generating content for a lookup table for selection of one or more samples to be used for determination of a value of a symbol from a data stream, wherein the apparatus includes: a transition offset detector configured to offsets that occur between an average transition location and actual transition locations within samples, wherein the data stream is sliced at a sampling rate that is at least 4 times higher than a baud rate of the data stream; an offset averaging block configured to collect offsets independently by previous detected symbol pattern when a current determined symbol is different from the determined symbol for the previous baud interval, wherein the previous detected symbol pattern comprises one or more prior symbols, wherein the offset averaging block is further configured to discard a collected offset when the current determined symbol is the same as the determined symbol for the previous baud interval; and a controller configured to modify a value associated with the collected offset in the lookup table.

One embodiment includes an apparatus for adaptively adjusting or generating content for a lookup table for selection of one or more samples to be used for determination of a value of a symbol from a data stream, wherein the apparatus includes: means for collecting offsets independently by previous detected symbol pattern when a current determined symbol is different from the determined symbol for an immediately previous baud interval, wherein the previous detected symbol pattern comprises one or more prior symbols; means for collecting offsets independently by previous detected symbol pattern when a current determined symbol is different from the determined symbol for an immediately previous baud interval, wherein the previous detected symbol pattern comprises one or more prior symbols, and discarding a collected offset when the current determined symbol is the same as the determined symbol for the previous baud interval; and means for modifying a value associated with the collected count in the lookup table.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

While illustrated in the context of a SerDes communication link over an electrical wired channel, the principles and advantages described herein are also applicable to optical channels. One embodiment is used with a two state modulated signal and a communication channel with correlated impairments. For example, the signal received when reading the magnetic information off of a computer storage disk is characterized as a two state signal altered by correlated impairment.

Figure 1:
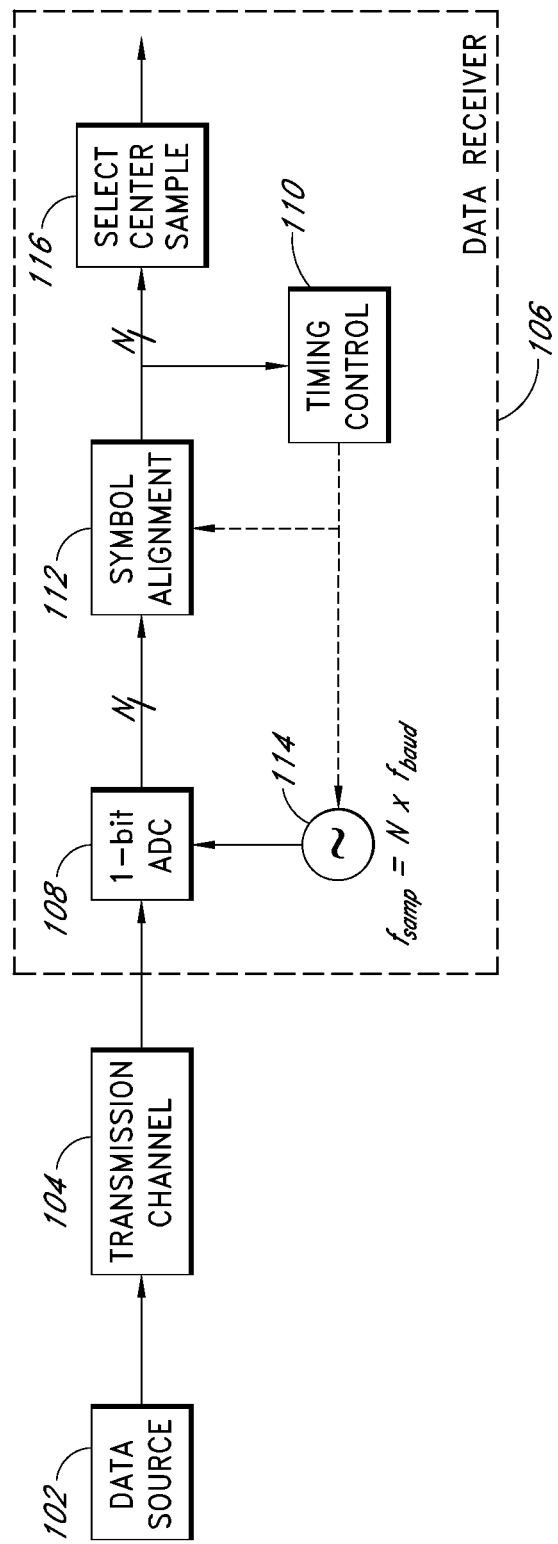
FIG. 1 illustrates a conventional SerDes system with a transmitter and a receiver.
Figure 2:
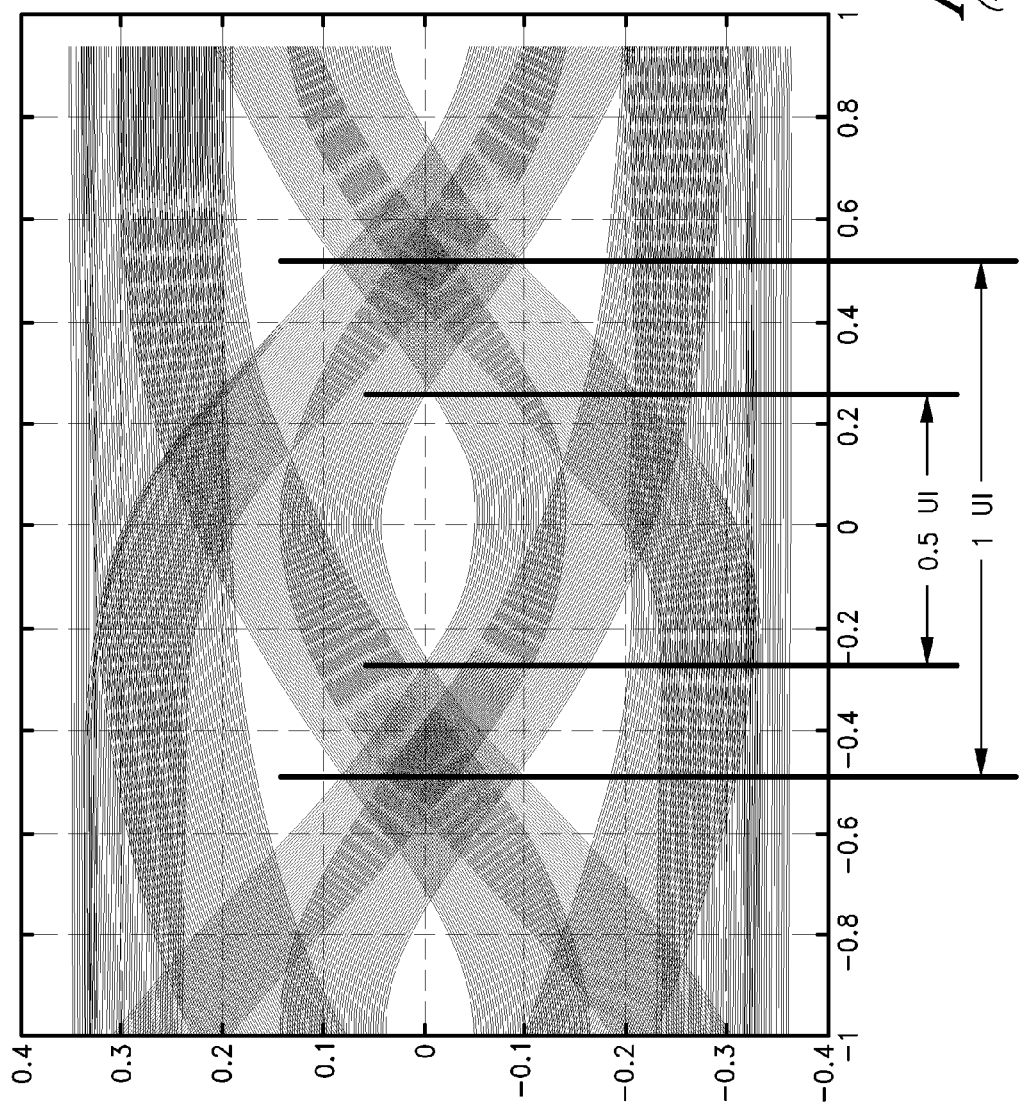
FIG. 2 illustrates an example of a data eye.

In FIG. 1, the transmitter (data source 102) converts a binary bit stream into a non-return-to-zero (NRZ) electrical waveform and transmits this over an electrical transmission channel 104, such as cables, backplanes, etc. At the input to the transmission channel 104, the integrity of the signal is very good and the "eye" of the signal is nearly 100% open. The transmission channel 104 is often characterized by a low-pass frequency response that induces sufficient ISI (Inter-Symbol-Interference) to reduce the "eye opening" of the signal, often to less than 50% UI (unit interval). The ISI causes both a variation in the signal amplitude at the center of the baud interval and a time variation in the transition between baud intervals. This is illustrated in FIG. 2. In this example, the eye is approximately 0.5 UI open (i.e., 50% open).

The impairments of the transmission channel 104 can be either linear or non-linear. A common example of a linear channel is an electrical backplane trace or cable that does not have non-linear active elements in its path. A common example of a non-linear channel is one that has a limiting amplifier that clips a linear channel signal into a square wave, which can result in a loss of soft amplitude information, but yet preserve phase information. Often, the signal continues to pass through a linear ISI inducing channel after the non-linear element.

The impaired signal is received and can be sampled by a single-threshold decision device 108, also known as a 1-bit ADC or a 1-bit slicer, at a rate that is a multiple N of the baud rate. Alternatively, the decision device 108 can utilize multiple thresholds even for NRZ signaling. The decision device 108 generates hard symbols from soft symbols. The generation of the sampling clock signal is often impaired by a number of sources and incurs a temporal variation that can be described by a Gaussian or near-Gaussian distribution.

A timing control block 110 examines the sampled data to determine the location corresponding to the center of the data eye (FIG. 2) and indicates to a portion of the data path (symbol alignment block 112) which sample is to be used as the data decoding sample by aligning the center sample of the N samples per baud to correspond to the center of the data eye. For example, the symbol alignment block 112 can include delay elements, such as shift registers, and one or more multiplexers, wherein selection control of the multiplexer adjusts symbol alignment. In the conventional data receiver 106, the center sample of the N samples per baud is selected 116 for use. One embodiment of the timing control block 110 is described in greater detail in U.S. patent application Ser. No. 12/361,436 by Warner, filed Jan. 28, 2009, titled "Jitter Tolerance Improvement," the disclosure of which is hereby incorporated by reference herein.

Alternatively, information can be fed back to control the frequency and phase of the sampling (sampling clock 114) to maintain timing alignment of the eye, thus reducing the N number of samples per baud used. The conventional described in connection with FIG. 1 functions properly when the combined impairments of channel ISI, sample timing jitter, and other various impairments do not result in too much closure of the data eye illustrated in FIG. 2.

Figure 3:
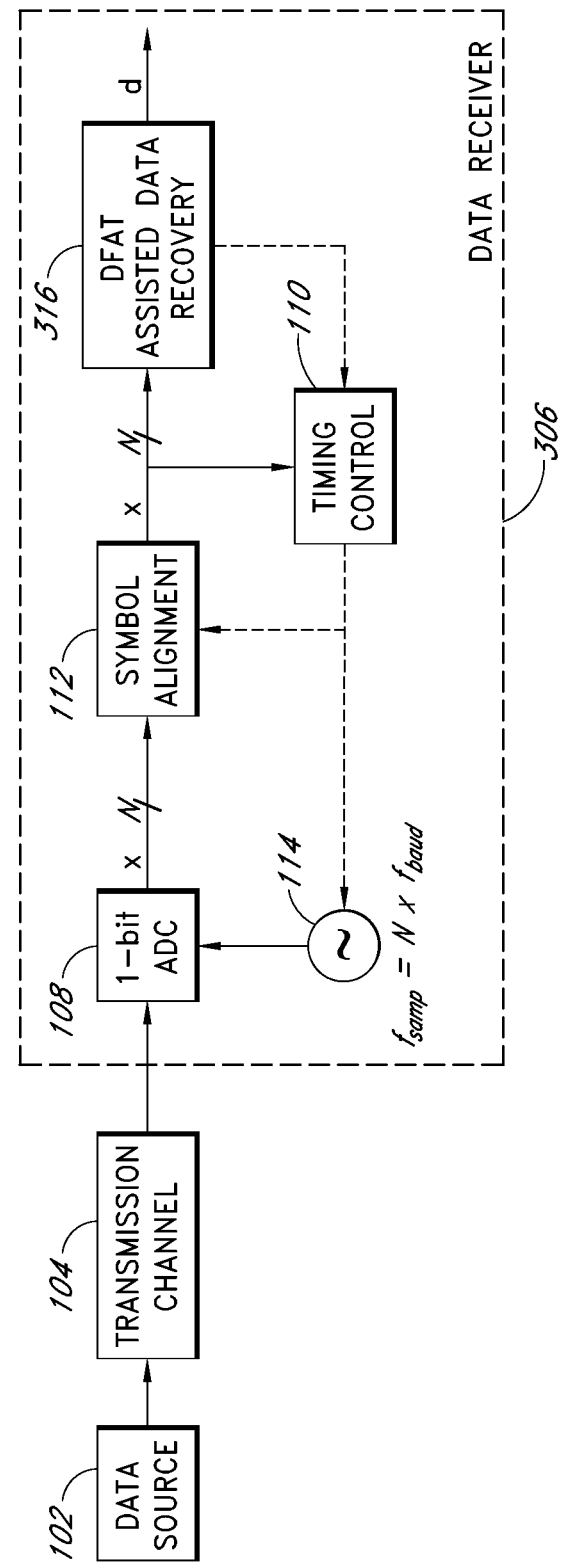
FIG. 3 illustrates a receiver with a decision feedback adjusted timing (DFAT) assisted data recovery block according to an embodiment of the invention.

FIG. 3 illustrates a receiver 306 with a decision feedback adjusted timing (DFAT) assisted data recovery block 316 according to an embodiment of the invention. The change at the system level block diagram of FIG. 3 can correspond to a replacement of the select center sample block 116 with the DFAT assisted data recovery block 316. Additionally, the DFAT assisted data recovery block 316 can optionally provide information to the timing control block 110 for improved performance in various situations. In contrast to the simple operation of the select center sample block 116, which selects the sample that is in the middle of a detection window as an output, the DFAT assisted data recovery block 316 provides a more intelligent technique of generating an output as will be described in greater detail in the following.

Figure 4:
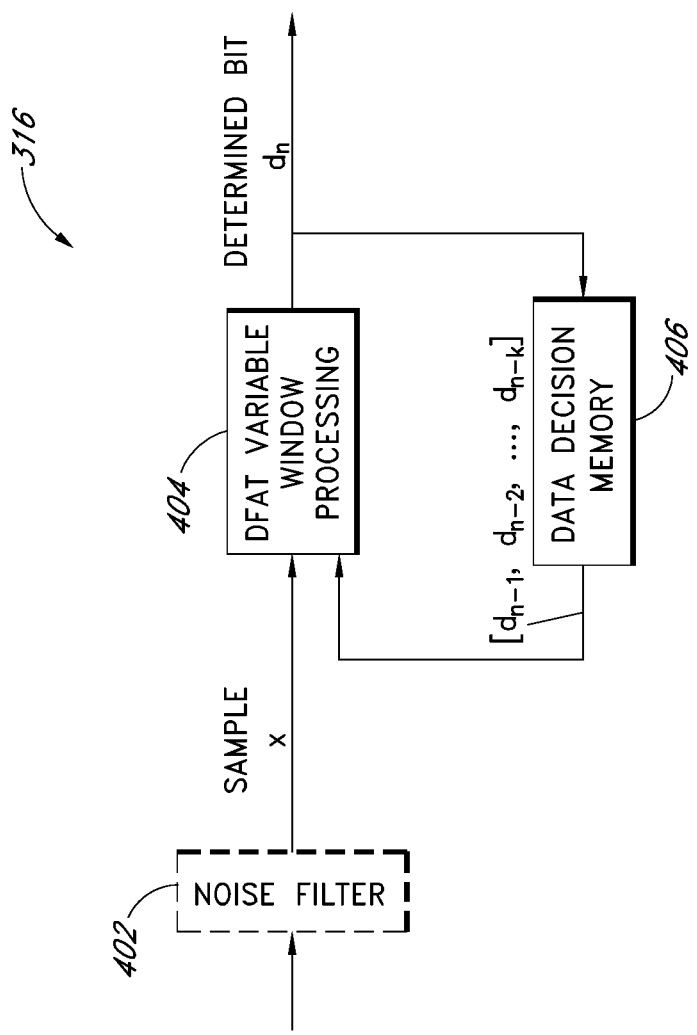
FIG. 4 illustrates one embodiment of a DFAT assisted data recovery block.

FIG. 4 illustrates one embodiment of the DFAT assisted data recovery block 316 in more detail. As illustrated in FIG. 4, the DFAT assisted data recovery block 316 includes an optional noise filter 402, a DFAT variable window processing block 404, and a data decision memory block 406. In one embodiment, the noise filter 402 can correspond to a majority logic filter or sparkle filter, an example of which will be described in greater detail later in connection with FIG. 9.

The DFAT variable window processing block 404 determines the decoded or determined value of the symbol for the baud interval. Decoding in this context corresponds to decoding of the line encoding, such as NRZ signaling and the like. A software/firmware embodiment of the DFAT variable window processing block 404 will be described in greater detail later in connection with FIG. 5. A hardware embodiment of the DFAT variable window processing block 404 will be described in greater detail later in connection with FIG. 6.

The data decision memory block 406 holds the decoding results of the most recent k baud intervals. The data decision memory block 406 can be implemented by, for example, a shift register configured as a serial in, parallel out (SIPO). A universal shift register can also be used for the data decision memory block 406. The shifting of data in the shift register can be at the baud rate. The previous decoding results ($d_{n-1}$, $d_{n-2}$, ... $d_{n-k}$) are provided as inputs to the DFAT variable window processing block 404 and used during the decoding of the symbol $d_n$ for the current baud interval.

Figure 5:
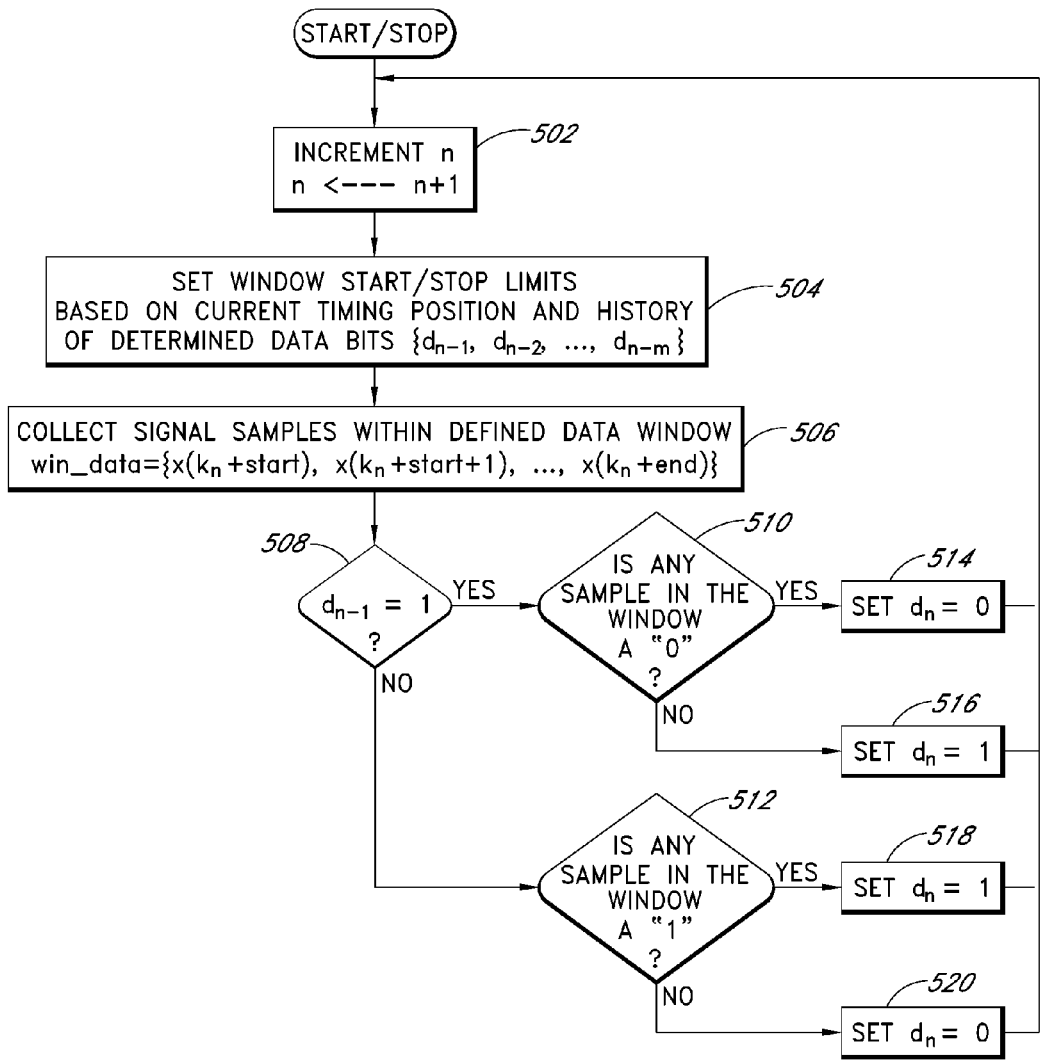
FIG. 5 is a flowchart that depicts functional processing provided by one embodiment of a DFAT variable window processing block.

FIG. 5 is a flowchart that depicts functional processing provided by one embodiment of the DFAT variable window processing block 404 (FIG. 4). It will be appreciated by the skilled practitioner that the illustrated process can be modified in a variety of ways. For example, in another embodiment, various portions of the illustrated process can be combined, can be rearranged in an alternate sequence, can be removed, or the like. Within the flowchart, the signal sample stream is represented as {x(1), x(2), x(2), ... }, and is sampled at N times the baud rate. Examples of appropriate data sampling rates are N=8, 12, 16, etc., but are not restricted to even numbers. In one embodiment, a sampling rate at least 4 times higher than the baud rate is used. Generally, a higher sampling rate will support better tolerance to ISI but at the expense of increased digital circuitry. Selection of the optimal sampling rate is dependent on a number of factors including, but not limited to, the following: ISI tolerance requirement, channel complexity, data baud rate, available processing resources. The determined data is represented as $\{d_1, d_2, d_3, \ldots\}$ and is at the baud rate. For both the signal sample stream and the determined data, an increasing index represents increasing time.

At the start of the process, it is assumed that data for the signal sample stream x is being received and that prior determined data $d_{n-1}, d_{n-2}, \ldots d_{n-m}$, is available. The process can be initialized by, for example, initially reverting to conventional operation until determined data $d_{n-1}, d_{n-2}, \ldots d_{n-m}$, is available. The illustrated process can be implemented by hardware or by software/firmware or by a combination of hardware and software/firmware. The software/firmware can correspond to computer instructions stored in a tangible, computer-readable medium, which are executed by a processor, such as a microprocessor. The hardware can correspond to custom application specific integrated circuits (ASICs), to field programmable gate arrays (FPGAs), and the like.

The process starts by incrementing 502 a loop counter n, which can be used to adjust memory pointers in a software/firmware implementation. The loop counter n increments to process new baud interval. In a hardware implementation, an actual loop counter n is typically not used, but is useful here to indicate the processing progression of the baud intervals. The process advances from the state 502 to a state 504.

In the state 504, the process sets start and stop limits for a window. The window corresponds to the set of sampled data x that is to be examined. The start and stop window limits can be specified as a function of the recently determined data bits d, beginning with the most recently determined data bit $d_{n-1}$ and extending backwards in time to $d_{n-m}$. In one embodiment, at least one or two previously determined bits are used. The function can be effectively implemented with a lookup table. Specification and characterization of a corresponding lookup table will be discussed in greater detail later in connection with FIG. 13. The process advances from the state 504 to a state 506.

In the state 506, the process collects signal sample(s) for analysis. In the absence of DFAT processing, a data sample $x(k_n)$ in the center of the baud interval is the data sample used as the determined data value for the baud interval. The windowing function collects all samples within the window defined by the start and stop offsets of the state 504. In one embodiment, the window is defined to be relative to the $x(k_n)$ sample. Note that in general the following conditions apply: both the start and stop offsets can be either positive or negative values; the end parameter should be greater than or equal to the start parameter; and the data sample $x(k_n)$ does not have to lie within the window. In the illustrated example of FIG. 5, the window is from sample $x(k_n+\text{start})$ to sample $x(k_n+\text{end})$, with the start and end offset or limit values determined in the state 504. The process advances from the state 506 to a decision block 508.

In the decision block 508, in the context of binary digits or bits, the process determines whether the previously determined symbol $d_{n-1}$ was a 1 or a 0. If the value of the previously determined symbol $d_{n-1}$ was a 1, the process proceeds to a decision block 510. If the value of the previously determined symbol $d_{n-1}$ was a 0, the process proceeds to a decision block 512. In an alternative embodiment with multiple threshold detection, additional branching can be used depending on the value of the digit $d_{n-1}$.

With respect to the decision block 510, if there is a sample x in the window that is a 0, that is, opposite to the state of the previously determined symbol $d_{n-1}$, then the process proceeds to a state 514 and sets the state for the symbol $d_n$ of the current baud interval to be 0 or opposite to the previously determined symbol $d_{n-1}$ and returns to the state 502 for processing of the next baud interval. Else, the process proceeds to a state 516 to set the state for the symbol $d_n$ of the current baud interval to be 1 or the same as the previously determined symbol $d_{n-1}$ and returns to the state 502 for processing of the next baud interval.

With respect to the decision block 512, if there is a sample x in the window that is a 1, that is, opposite to the state of the previously determined symbol $d_{n-1}$, then the process proceeds to a state 518 and sets the state for the symbol $d_n$ of the current baud interval to be 1 or opposite to the previously determined symbol $d_{n-1}$ and returns to the state 502 for processing of the next baud interval. Else, the process proceeds to a state 520 to set the state for the symbol $d_n$ of the current baud interval to be 0 or the same as the previously determined symbol $d_{n-1}$ and returns to the state 502 for processing of the next baud interval.

The processing flow branching of the decision block 508 based on the determined value of the previous baud interval $d_{n-1}$ allows the decoding block to handle asymmetric channel conditions, such as duty cycle distortion. When the channel is known to be or is treated to be symmetric, a modification of the functional logic depicted in FIG. 5 can be used to reduce complexity while achieving the same level of performance. The modification will be described in greater detail later in connection with FIG. 12.

Figure 6:
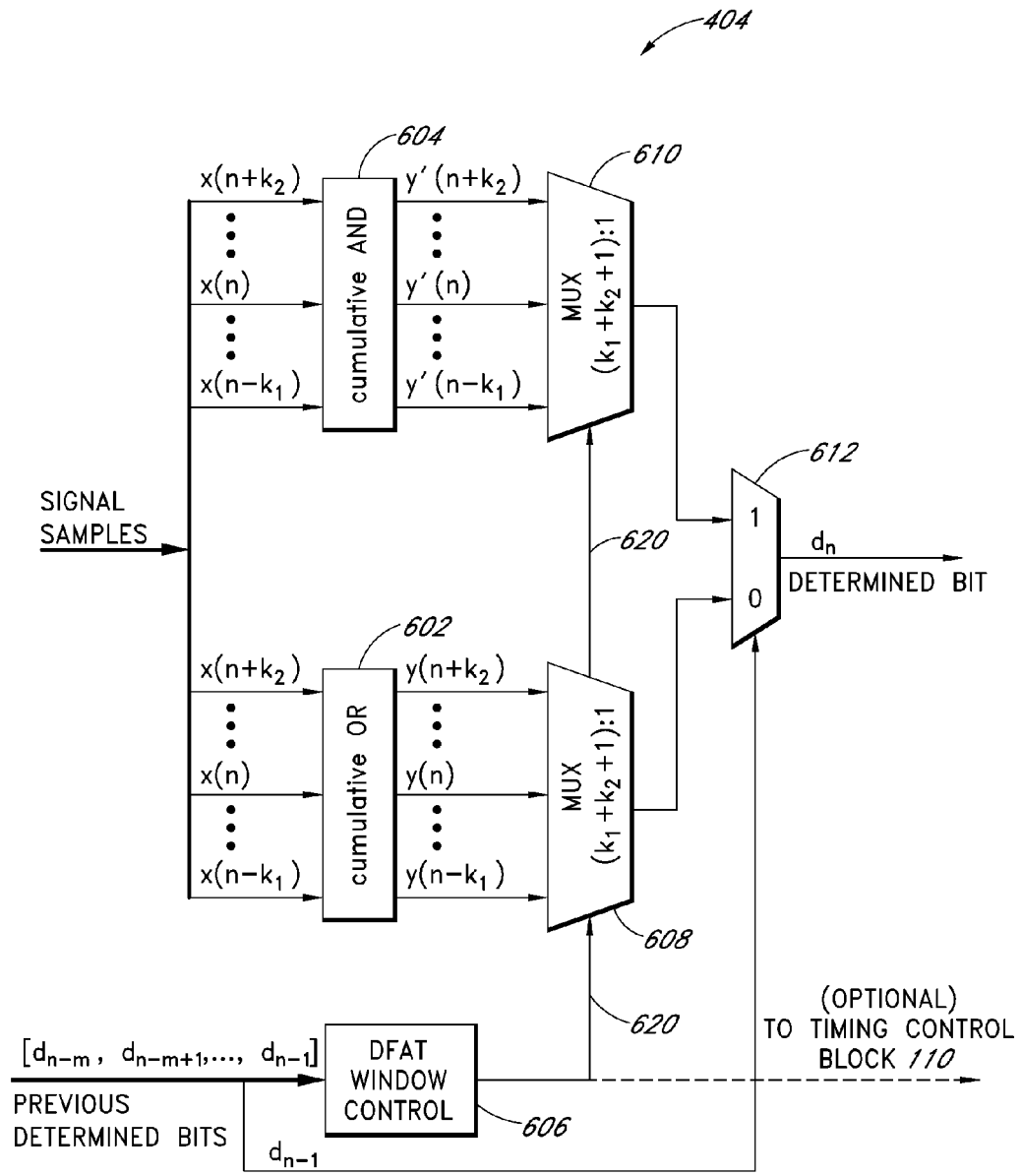
FIG. 6 illustrates a hardware embodiment of a DFAT variable window processing block.

FIG. 6 illustrates a hardware embodiment of the DFAT variable window processing block 404. As described earlier, there are N signal samples x for each baud interval resulting in a determined symbol d. In the illustrated example, the sampled data x (data between $x(n-k_1)$ and $x(n+k_2)$, inclusive) is passed to the DFAT variable window processing block 404 in parallel. For the sample data x, $x(n-k_1)$ represents the oldest sample, $x(n+k_2)$ representing the most recent sample, and $x(n)$ representing the centered sample that is conventionally selected for data decoding in the absence of DFAT. Normally, the values for $k_1$ and $k_2$ can be equal, but depending on the transmission channel characteristics, non equal values may be preferable. Also, the sum of $k_1+k_2$ is typically less than the value for N, which is the number of samples of the signal taken per baud period.

As will be discussed in greater detail in the following, the DFAT variable window processing block 404 implements a variable width window detect function in which the span and position of the window can be a function of the previously determined bits $d_{n-m}, d_{n-m+1}, \ldots, d_{n-1}$. This greatly improves the ability of the receiver 306 to correctly determined symbols in the presence of correlated impairments. The samples within the variable window are applied to an OR function and to an AND function. The result of the OR function or the AND function can be selected based on one or more values of the previously determined symbols. In one embodiment that will be described in connection with FIG. 6, the OR function and the AND function occurs earlier than the variable window function.

FIG. 6 illustrates an embodiment of the DFAT variable window processing block 404. The DFAT variable window processing block 404 includes a cumulative OR function block 602, a cumulative AND function block 604, a DFAT window control function block 606, a first multiplexer 608, a second multiplexer 610, and a third multiplexer 612. Of course, the first multiplexer 608, the second multiplexer 610, and the third multiplexer 612 can be combined. The first multiplexer 608, the second multiplexer 610, and the third multiplexer 612 can be considered to be a cumulative-OR multiplexer, a cumulative-AND multiplexer, and an output multiplexer, respectively.

As shown in the figure, the $k_1+k_2+1$ samples from $x(n-k_1)$ to $x(n+k_2)$ are applied as inputs to the cumulative OR function block 602 and to the cumulative AND function block 604. One embodiment of the cumulative OR will be described in greater detail later in connection with FIG. 7. One embodiment of the cumulative AND function will be described in greater detail later in connection with FIG. 8.

The output from the DFAT window control function block 606 is used to select one of the cumulative OR and one of the cumulative AND outputs via the first multiplexer 608 and the second multiplexer 610, respectively. Based on the recent history of determined data bits, the DFAT Window Control function block 606 will generate a multiplexer control signal 620 between $-k_1$ and $+k_2$ to control the selection of the multiplexers 608, 610. The multiplexer control signal instructs the two selection multiplexers 608, 610 to select one of the inputs to the multiplexers 608, 610. A further selection of one of these two multiplexer outputs is made based on the value of the most recently determined data symbol $d_{n-1}$. When the prior determined data symbol $d_{n-1}$ is a 0, the output of the first multiplexer 608 is selected so that cumulative OR function is invoked. When the prior determined data symbol $d_{n-1}$ is a 1, the output of the second multiplexer 610 is selected so that the cumulative AND function is invoked. The output of the third multiplexer 612 is the determined symbol $d_n$ of the current baud period.

The generation of the multiplexer selection control signal 620 by the DFAT window control function block 606 can be based upon a polynomial or other numerical function of the previously determined data, or more generally can be based on mapping function in which the previously determined data bits can be provided as an address into a storage block or lookup table (LUT). For example, each element of the storage block can contain the desired multiplexer selection information for that set or combination of previously determined data bits $d_{n-m}, d_{n-m+1}, \ldots, d_{n-1}$. The lookup table based method is typically more practical to implement than a function-based approach and can typically operate much faster and with less latency. One example of a technique to generate the contents of the DFAT LUT will be described in greater detail later in connection with FIG. 13.

Figure 7:
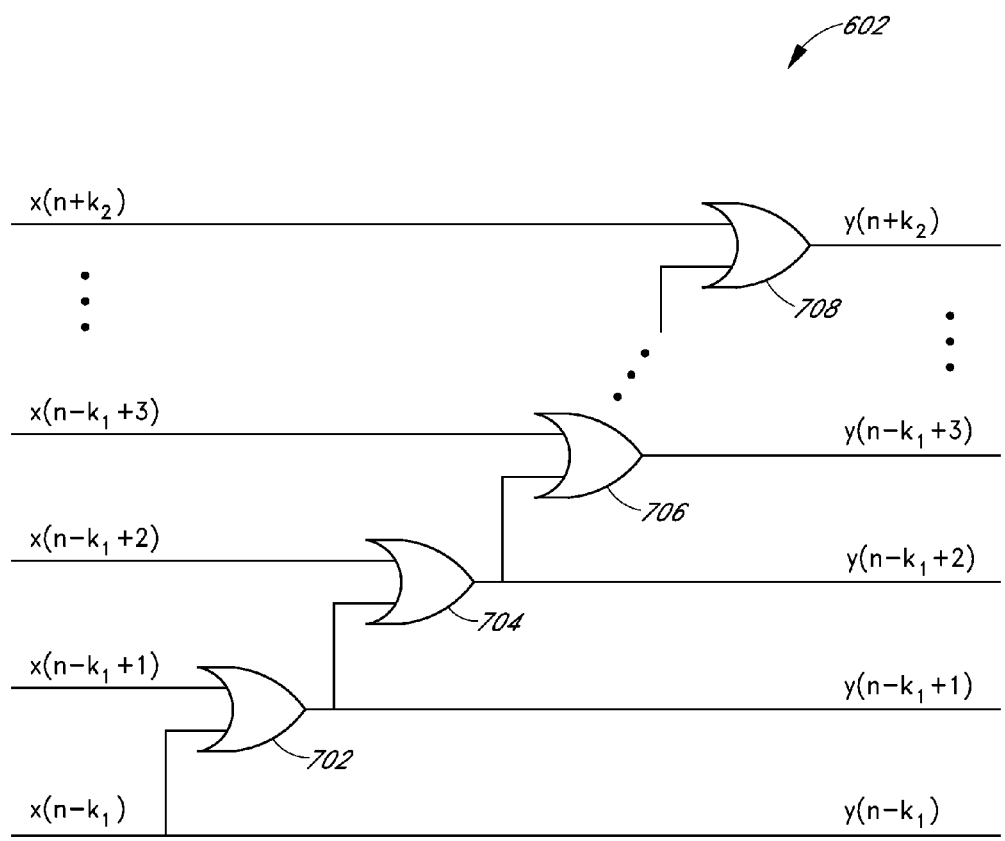
FIG. 7 illustrates one embodiment of a cumulative OR function block.

FIG. 7 illustrates one embodiment of the cumulative OR function block 602 (FIG. 6). While illustrated with 2-input OR gates 702, 704, 706, 708, of course, equivalent circuits can be used. In addition, the number of inputs, OR-gates, and outputs can vary in a very broad range so that the number of input samples and derivative samples generated can be fewer than or more than the number illustrated in FIG. 7.

Input samples $x(n-k_1)$ to $x(n+k_2)$ are provided as inputs to the OR gates 702, 704, 706, 708, with input sample $x(n-k_1)$ being earlier in time than input sample $x(n+k_2)$. The input samples can be provided by, for example, providing the input samples x to a serial input parallel output (SIPO) or to a shift register having parallel outputs. The OR gates 702, 704, 706, 708 generate derivative samples $y(n-k_1)$ to $y(n+k_2)$. As illustrated in FIG. 6, the first multiplexer 608 selects one of the derivative samples $y(n-k_1)$ to $y(n+k_2)$, which effectively adjusts the window size.

Derivative sample $y(n-k_1)$ is the same state as input sample $x(n-k_1)$ so that derivative sample $y(n-k_1)$ is a 1 when input sample $x(n-k_1)$ is a 1, and 0 otherwise. Derivative sample $y(n-k_1+1)$ is a 1 if there is at least one 1 in input sample $x(n-k_1)$ or input sample $x(n-k_1+1)$. Derivative sample $y(n-k_1+2)$ is a 1 if there is at least one 1 in any of input samples $x(n-k_1)$ to $x(n-k_1+2)$. Derivative sample $y(n-k_1+3)$ is a 1 if there is at least one 1 in any of input samples $x(n-k_1)$ to $x(n-k_1+3)$, and so on, such that derivative sample $y(n+k_2)$ is a 1 if there is at least one 1 in any of input samples $x(n-k_1)$ to $x(n+k_2)$. In alternative embodiments, a fewer number or a greater number of samples are evaluated by the OR logic.

Figure 8:
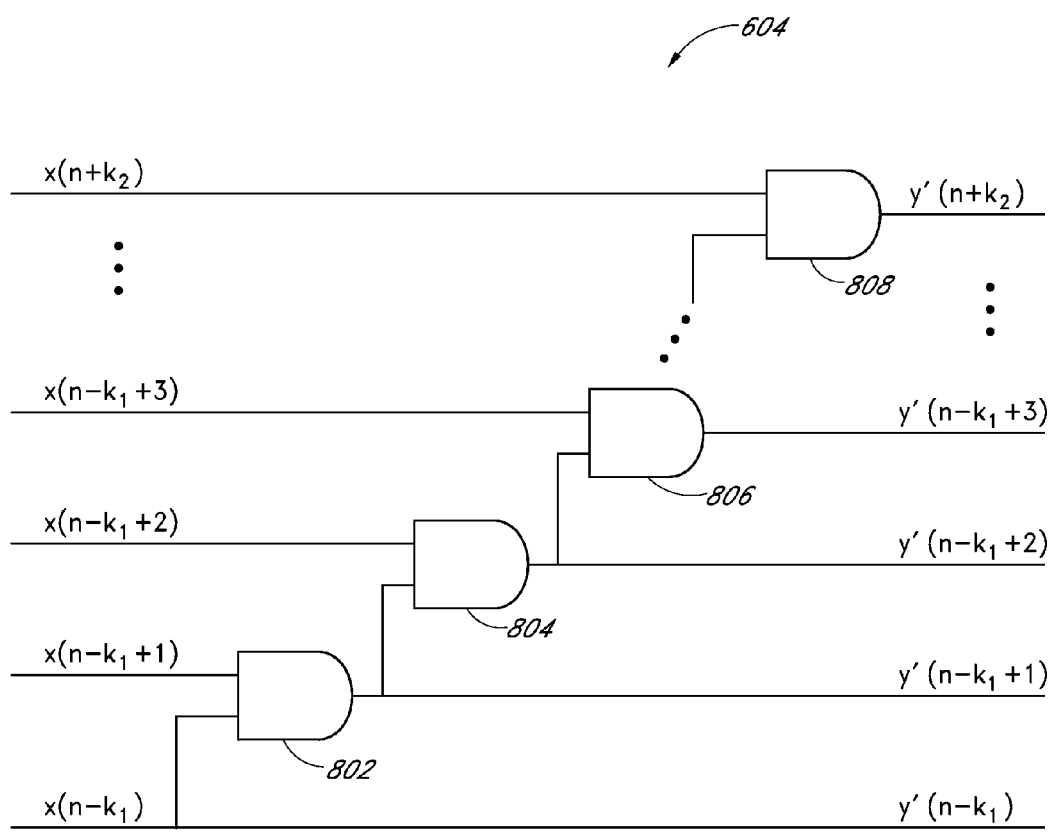
FIG. 8 illustrates one embodiment of a cumulative AND function block 604.

FIG. 8 illustrates one embodiment of the cumulative AND function block 604 (FIG. 6). While illustrated with 2-input AND gates 802, 804, 806, 808, of course, equivalent circuits can be used. In addition, the number of inputs, AND-gates, and outputs can vary in a very broad range so that the number of input samples and derivative samples generated can be fewer than or more than the number illustrated in FIG. 8.

Input samples $x(n-k_1)$ to $x(n+k_2)$ are provided as inputs to the AND gates 802, 804, 806, 808, with input sample $x(n-k_1)$ being earlier in time than input sample $x(n+k_2)$. The input samples can be provided by, for example, providing the input samples x to a serial input parallel output (SIPO) or to a shift register having parallel outputs. The AND gates 802, 804, 806, 808 generate derivative samples $y'(n-k_1)$ to $y'(n+k_2)$. As illustrated in FIG. 6, the second multiplexer 610 selects one of the derivative samples $y'(n-k_1)$ to $y'(n+k_2)$, which effectively adjusts the window size.

Derivative sample $y'(n-k_1)$ is the same state as input sample $x(n-k_1)$ so that derivative sample $y'(n-k_1)$ is a 0 when the input sample $x(n-k_1)$ is a 0, and 1 otherwise. Derivative sample $y'(n-k_1+1)$ is a 0 if there is at least one 0 in input sample $x(n-k_1)$ or input sample $x(n-k_1+1)$. Derivative sample $y'(n-k_1+2)$ is a 0 if there is at least one 0 in any of input samples $x(n-k_1)$ to $x(n-k_1+2)$. Derivative sample $y'(n-k_1+3)$ is a 0 if there is at least one 0 in any of input samples $x(n-k_1)$ to $x(n-k_1+3)$, and so on, such that derivative sample $y'(n+k_2)$ is a 0 if there is at least one 0 in any of input samples $x(n-k_1)$ to $x(n+k_2)$. In alternative embodiments, a fewer number or a greater number of samples are evaluated by the AND logic.

Figure 9:
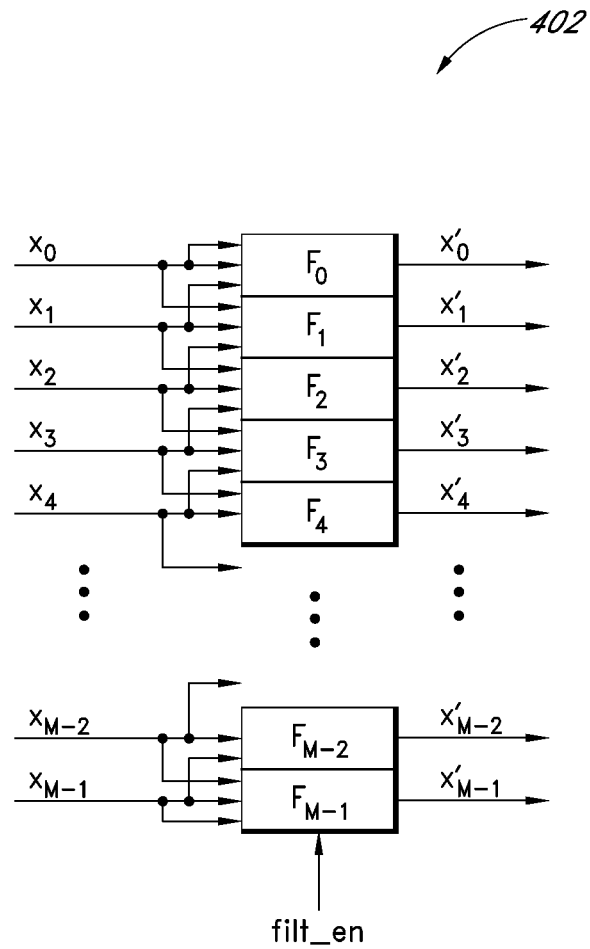
FIG. 9 illustrates one embodiment of a noise filter.

FIG. 9 illustrates one embodiment of the noise filter 402 (FIG. 4). The illustrated embodiment is a 3-tap majority logic filter. As discussed earlier in connection with FIG. 4, the noise filter 402 can be optional. Without the noise filter 402, the DFAT assisted data decoding can be sensitive to noise. For example, within a particular cumulative OR window, if any samples are 1 due to noise, but otherwise should be a 0, then the output will falsely be a 1 due to the noise. Correspondingly, within a particular cumulative AND window, if any samples are 0 due to noise, but otherwise should be a 1, then the output will falsely be a 0 due to the noise. In the event that noise is an issue in the system, simple filtering of the sample data prior to application to the DFAT variable window processing will greatly reduce noise sensitivity. The placement of the noise filter 402 in the data stream prior to the DFAT variable window processing block 404 was illustrated earlier in FIG. 4.

An applicable filtering mechanism is a majority logic filter as illustrated in FIG. 9. The example shows a 3-tap majority logic filter, but this can easily be extended to larger spans. A larger span can improve noise tolerance but can have a negative impact on the worse case ISI that can be tolerated. For example, typically, 3 consecutive samples are provided as inputs to the 3-tap majority logic filter. With the 3-tap majority logic filter, when 2 or 3 of the inputs have a logic state of 1 or 0, the output is 1 or 0, respectively. In one embodiment, the noise filter 402 is present in the circuit or software/firmware embodiment, but can be selectively activated by a control signal filt_en.

The noise filter 402 can also be used to correct other impairments. Embodiments of the invention can also be sensitive to impairments of the 1-bit ADC or slicer. For example, when multiple 1-bit ADCs are configured in parallel in a time staggered manner, the 1-bit ADCs can have slightly different decision voltage thresholds and time offset errors. As a result, it is possible for a transition from one polarity symbol value to the opposite polarity symbol value to be represented by the sample sequence 00010111. This condition is referred to as a "bubble error." The 3-tap majority logic filter can also correct the bubble error and generate the correct sequence 00001111 as an output.

Returning now to FIG. 3, the block diagram of FIG. 3 illustrates the optional feedback of information from the DFAT assisted data recovery block 316 to the timing control block 110. It should be noted that the timing of the timing control block 110 is not the same as the timing of the "T" in DFAT, which refers to an adjusted detection window. The source of this optional feedback information is the predicted offset of the threshold crossing for the current baud from the DFAT window control function block 606 (FIG. 6). The timing control block 110 determines the location of each threshold crossing between baud periods having opposite symbol polarity. This location will typically have an offset from the average timing position due to local data pattern dependencies arising from intersymbol interference and data dependent jitter (ISI/DDJ). The timing control block 110 filters the measured offset data and uses the offset to adjust the timing position in a feedback mechanism.

By contrast, conventionally, the measured timing error contains both offsets that are independent of the received data pattern, and offsets that are correlated to the received data pattern. The DFAT window control function block 606 allows for the correlated offsets to be removed from consideration by the timing control block 110. In the absence of this enhancement to timing control, the timing control block 110 will attempt to track timing offsets that are correlated to the received data. When the data is well randomized, then the timing control will likely not be affected greatly by these correlated offsets. However, for some data patterns, this will not be the case and the timing tracking will work in opposition to the DFAT assisted data recovery block 316.

Figure 10:
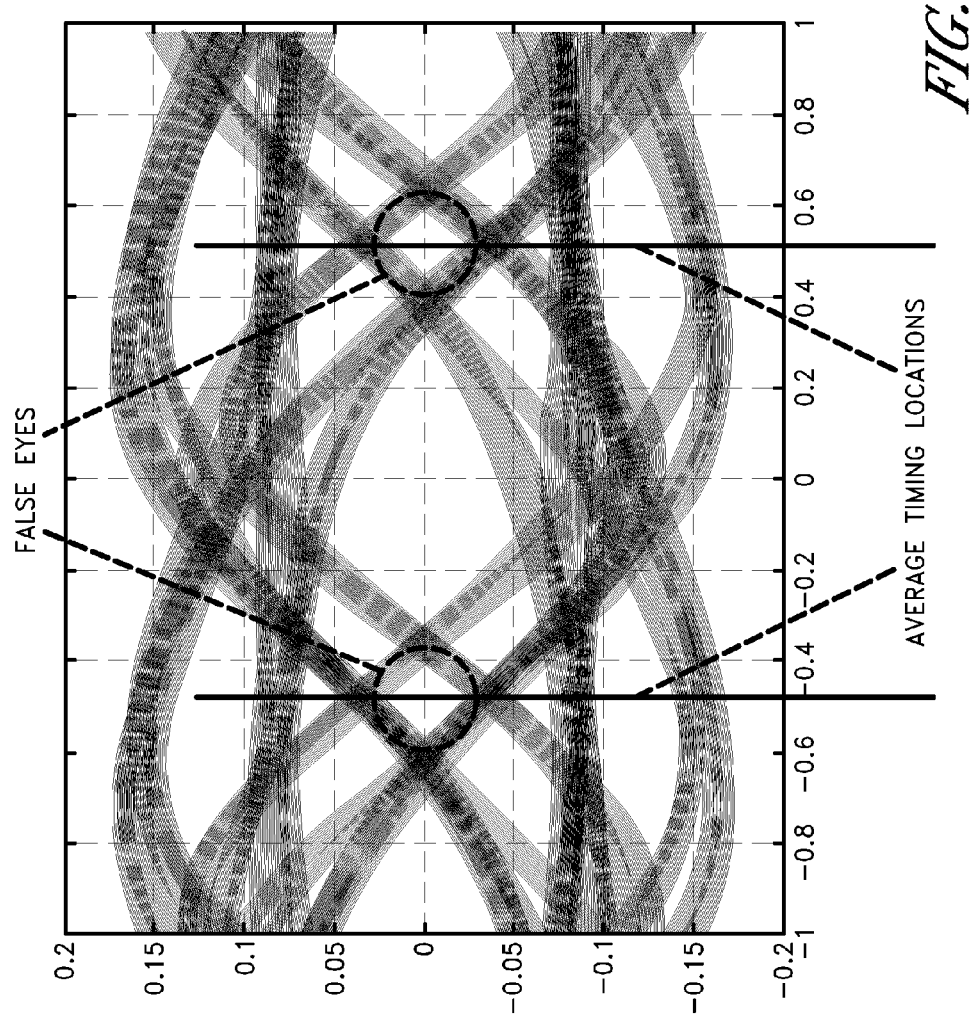
FIG. 10 illustrates another example of a data eye.

FIG. 10 illustrates another example of a data eye. As another benefit of the optional feedback of information from the DFAT assisted data recovery block 316, consider the problem of false locks that can occur. Those skilled in the art will recognize that under certain channel conditions, the received signal eye can be characterized with two or more data eyes. An example of this is shown in FIG. 10. The small eyes on either side of the actual data eye are false eyes and surround the location of the average transition between baud states. A conventional receiver can incorrectly lock onto a false eye as though it were the correct data eye. In receivers using multi-level ADCs and equalizers such as feed-forward equalizers (FFEs) or decision feedback equalizers (DFEs), the presence of the equalizer can greatly reduce the severity of the false eye and timing recovery can function properly. The inclusion of information from the DFAT assisted data recovery block 316 into the timing control block 110 also greatly reduces the susceptibility to the false eye problem.

Those skilled in the art will recognize that even with dedicated hardware based implementation and the most advanced semiconductor processing technologies, there is a finite data rate that can be supported with a serial implementation. When support of higher data rates is to be provided, receivers are often configured to process multiple baud periods in parallel. The highest supported data rate can advantageously become a multiple of that possible with non-parallel processed implementation.

Figure 11:
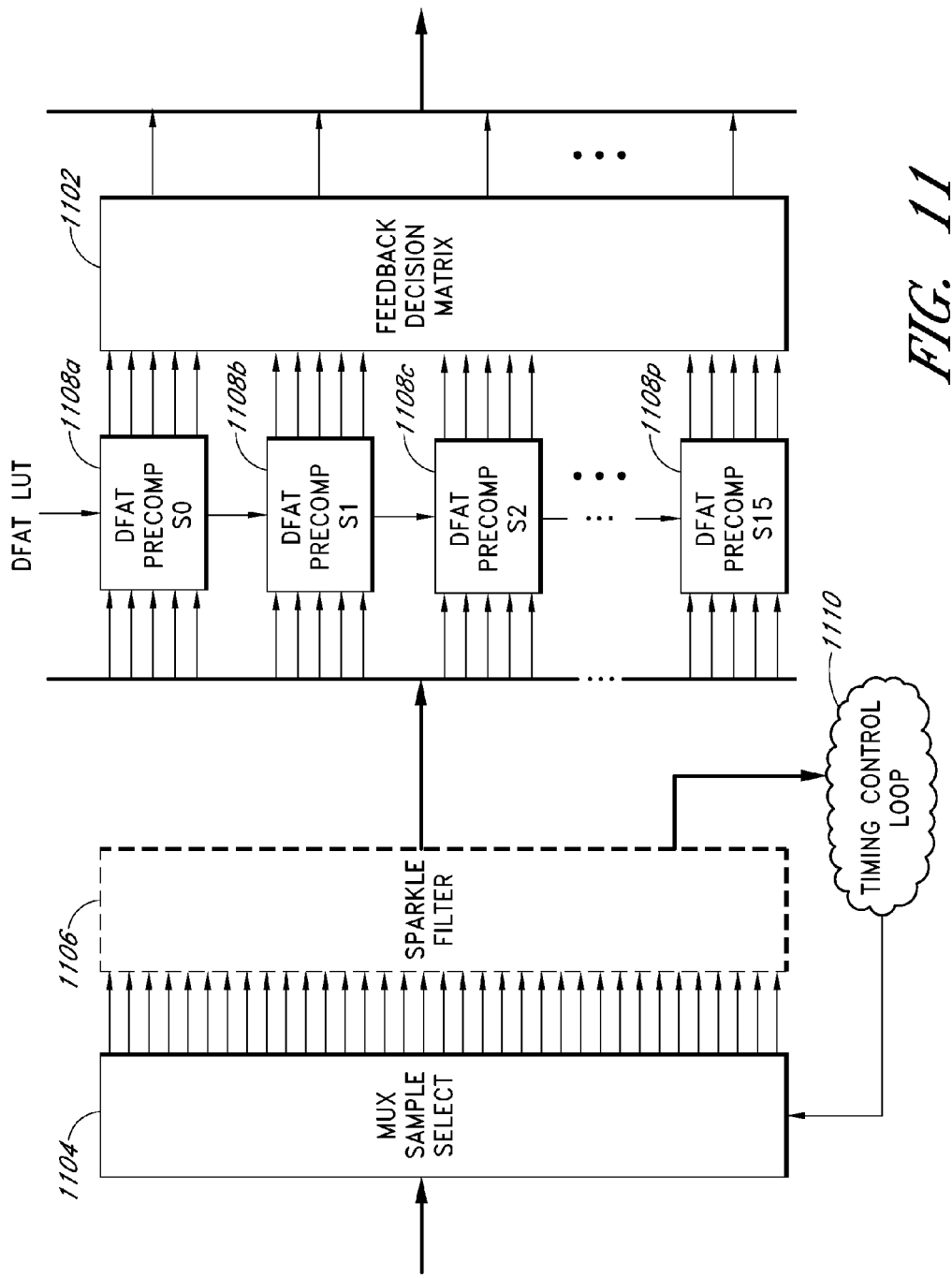
FIG. 11 illustrates an example of a parallel processing implementation in the context of non-return-to-zero (NRZ) signaling.

FIG. 11 illustrates an example of a parallel processing implementation. For a finite duration of consideration of previously determined data bits, there are a finite number of possible determined outcomes of the DFAT detector. Thus, the various possible outcomes can be computed in parallel by DFAT pre-computation blocks 1108a-1108p for the baud periods of the finite duration, and these outcomes can be provided to a feedback decision matrix 1102 for selection of a relatively good, such as the best, outcome for each baud period based on the outcome for previous baud periods, even if the previous baud periods occur in the same block of parallel samples. The DFAT pre-computation blocks 1108a-1108p and the feedback decision matrix 1102 can be functionally similar to the data decision memory block 406 (FIG. 4), the DFAT window control function block 606, and the multiplexers 608, 610, 612 (FIG. 6).

The feedback decision matrix 1102 is architecturally similar to decision feedback equalizer structures for parallel processing. The feedback decision matrix 1102 can be a bottleneck in the ability to operate at very high data rates. Beneficially, advances that are made in the architecture and implementation of full look-ahead decision matrices for decision feedback equalizers can be applied to embodiments of the feedback decision matrix 1102.

The illustrated parallel processed implementation example operates on 16 baud intervals in parallel, and can support significantly higher data rates than a non-parallel processed implementation. A multiplexer (mux) sample select 1104 collects input samples. The multiplexer sample select 1104 can include a 1-bit slicer and a serial in parallel out (SIPO) circuit. The outputs of the multiplexer sample select 1104 can be considered to be raw or unfiltered. An optional sparkle filter 1106 can provide filtering in a manner akin to the optional noise filter 402 (FIG. 4). In one embodiment, a 3-tap majority logic filter can be used for the optional sparkle filter 1106 as described earlier in connection with FIG. 9. A timing control loop 1110 can be functionally similar to the timing control block 110 described earlier in connection with FIGS. 1 and 3.

The 16 DFAT pre-computation blocks 1108a-1108p are passed raw or filtered data that aligns with the baud interval being processed by that block. The pre-computation blocks 1108a-1108p can be functionally similar to the cumulative OR function block 602 and the cumulative AND function block 604 (FIG. 6). However, in contrast to a sequential embodiment in which the previous determined bits $d_{n-m}$, $d_{n-m+1}, \ldots, d_{n-1}$ are available, the previous determined bits are typically not available when processing in parallel. Accordingly, in one parallel embodiment, all the combinations of possible outputs are computed by the pre-computation blocks 1108a-1108p in a "look-ahead" manner for the given number of previous bits used, and then as the actual values for the previous bits are determined, the appropriate output is selected by the feedback decision matrix 1102. For example, if 3 prior bits are used, then there are $2^3$ or 8 possible output combinations to be pre-computed.

Each DFAT pre-computation block 1108a-1108p then computes possible outcomes as outputs and provides the outcomes as inputs to the feedback decision matrix 1102. The number of outcomes computed by a block of the DFAT pre-computation blocks 1108a-1108p is a function of the number of previous bit decisions considered by DFAT. For example, if a DFAT pre-computation block considers 5 previous bit decisions $d_{n-1}$ to $d_{n-5}$, then there will be $2^5$ or 32 possible outcomes to compute.

The architecture shown in FIG. 11 has the benefit of maximum supported data rate. However, it also has the disadvantage of relatively high gate count to support the look-ahead computation of the possible outcomes, that is, brute force computation. For data rates that are less extreme relative to the available digital logic speed capabilities, there are numerous variations of the architecture shown in FIG. 11 that will be readily apparent to those skilled in the art. For example, when sufficient time is available to identify the outcomes that are "don't cares," computation of these outcomes can be avoided and fewer than all possible outcomes can advantageously be computed in a "look-ahead" fashion.

In symmetric channel environments, the number of computations can be further reduced. The eye diagrams of FIG. 2 and FIG. 10 illustrate channels that have inter-symbol interference (ISI) that is symmetric about the mean amplitude of the signal. For these types of channels, the ISI resulting from a particular sequence of data bits should be identical to the ISI resulting from the logical inverse of that same sequence. For example, consider a specific data pattern 11010 that has previously been determined. If the next data bit is a 1, then the zero crossing of the signal to that 1 will be affected in a deterministic manner dependent on that specific data pattern. Now, consider the logical inversion, 00101. If the next data bit is a 0, then the zero crossing of the signal to that 0 will be affected in manner identical to the non-inverted case with the next data bit transitioning to 1.

Figure 12:
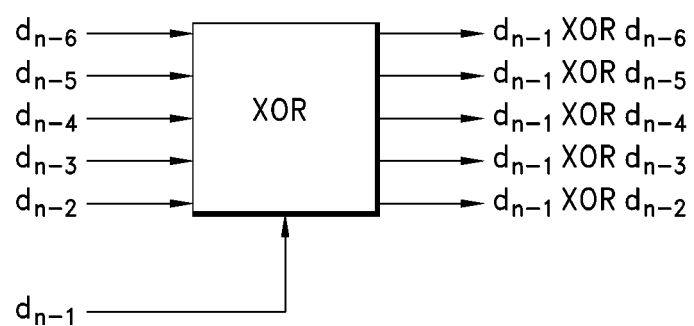
FIG. 12 illustrates an example of a block XOR encoding mechanism.

For the case of symmetric channels, DFAT performance can be improved for a given complexity of the look-ahead processing by considering the XOR-processed bit pattern of previously determined bits rather in place of the unmodified bit pattern. By using an XOR-processed pattern, an additional bit period of data history can be exploited. This is illustrated in FIG. 12, in which the history of 6 previous determined bits $d_{n-1}$ to $d_{n-6}$ are XOR coded into a 5-bit pattern. A pattern and its logical inverse have the same XOR pattern.

To illustrate the advantage, on symmetric channels, a 5-bit DFAT with XOR-processed encoding will have the same performance as a 6-bit DFAT without XOR-processed encoding.

Given the general architecture as shown in FIG. 11, the encoding mechanism can be incorporated in the feedback decision matrix 1102. Of course, the contents of the DFAT LUT should be adjusted accordingly.

FIG. 12 illustrates an example of a block XOR encoding mechanism. It is equally acceptable to have sequential XOR encoding. Depending on the precise implementation, one mode may have implementation advantages over the other.

Those knowledgeable in the art will recognize the problem of timing recovery in the presence of data pattern dependencies. For example, in systems using 8B/10B data encoding, there are specific test patterns, for example, JTPAT, that should be tolerated. Often, basic timing recovery mechanisms will fluctuate, forward and back in time relative to the average timing position, due to different portions of the JTPAT signal interacting differently with the transmission channel 104.

Equalization of the signal by the receiver, either in analog or in digital, alleviates much of this problem. However, when data receivers use simple slicers (1-bit) to sample the signal, conventional digital feedback equalization is typically less effective than desirable.

One embodiment provides a mechanism to alleviate the problem of timing sensitivity to data pattern dependencies. For a baud period, DFAT accounts for the timing shift in the threshold crossing that is due to ISI. In one embodiment, DFAT estimates the timing shift and provides the timing shift to the timing loop such that the estimated timing offsets can be removed from the measured timing offsets, thus reducing or eliminating the problem.

Figure 13:
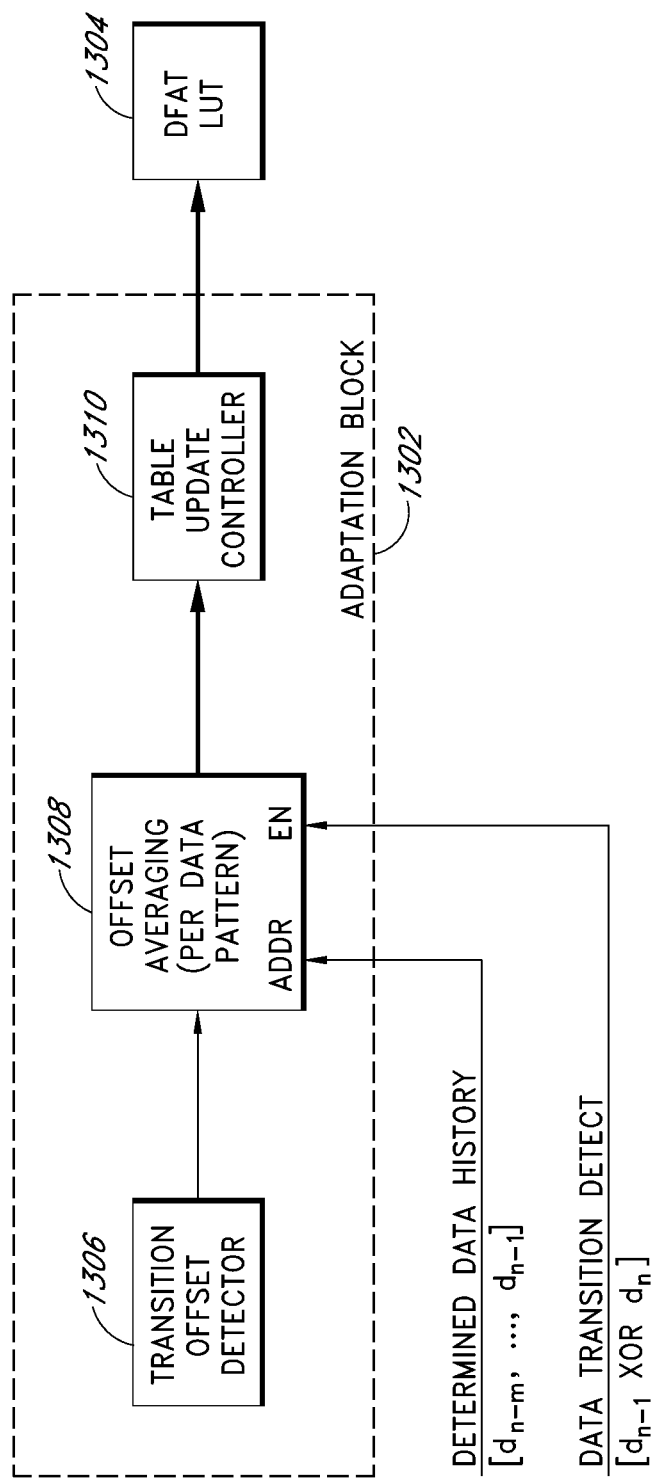
FIG. 13 illustrates one embodiment of a DFAT LUT adaptation block.

In one embodiment, the DFAT window control function block 606 (FIG. 6) includes a DFAT lookup table (LUT) 1304. The DFAT LUT 1304 can also be used in the state 504 of the process of FIG. 5. FIG. 13 illustrates one embodiment of a DFAT LUT adaptation block 1302, which generates the contents for the DFAT LUT 1304 for the state 504 (FIG. 5) or for the DFAT window control function block 606. In contrast to decision feedback equalizer lookup tables, which contain equalization information, the contents of the DFAT LUT adaptation block 1302 contains timing information for sample selection. The DFAT LUT adaptation block 1302 can be implemented in either hardware or software/firmware, or a combination of both. In one embodiment, the DFAT assisted data recovery block 316 is implemented primarily in hardware, and the DFAT LUT adaptation block 1302 is implemented primarily in software/firmware. The DFAT LUT adaptation block 1302 can be shared among the data paths of the DFAT assisted data recovery block 316. Prior to adaptation, the DFAT LUT 1304 can be initialized such that the DFAT assisted data recovery block 316 provides conventional operation, such as selection of a sample in the center of the baud interval.

In one embodiment, the DFAT LUT 1304 contains the expected timing offsets of a signal transition as a function of the previously determined data bits. There are many ways to adapt the DFAT LUT 1304. Described below is a simple but effective technique, but other techniques will be readily determined by one of ordinary skill in the art.

The DFAT LUT adaptation block 1302 includes a transition offset detector 1306, an offset averaging block 1308, and a table update controller 1310. The DFAT LUT adaptation block 1302 determines an average offset (timing wise) of the location of a transition given the previous data pattern. For example, a moving average, such as an exponentially weighted moving average can be used. This compensates for timing variations that occur with correlated impairments, which can result in inter-symbol interference (ISI) and data dependent jitter (DDJ).

The transition offset detector 1306 determines an offset or the number of sample clock cycles that occur between an average transition location and an actual transition location within the samples. A timing recovery loop that includes the timing control 110 (FIGS. 1 and 3) can provide the average transition location of a transition, and the transition offset detector 1306 provides the offset relative to the average transitional. Whether or not an actual transition occurred can be determined by XORing consecutive samples as illustrated in an input to the offset averaging block 1308.

For each baud period, the DFAT LUT adaptation block 1302 uses the measured offset of the transition (assuming a transition occurred) relative to the average timing position, and uses the determined bit value of the current baud and previous baud intervals. Using this information, the detected transition offsets are averaged 1308 independently for each data pattern. This averaging 1308 is gated on a per baud period basis by the detection of a baud transition from the signal data transition detect.

After a sufficient number of averaged offsets are collected, the table update controller 1310 updates the DFAT LUT 1304 based on the averaged offsets. The update vector can be a simple copying operation to override previously stored values, or can be a blending of the current values with the new values.

When the DFAT assisted data recovery block 316 is modifying timing to reduce data pattern dependencies, the operation under the updated DFAT LUT 1304 can result in changes to the average transition offset, and the DFAT LUT 1304 can be repeatedly updated until convergence is achieved.

In addition, if the ISI characteristics of the transmission channel 104 change over time, the DFAT LUT 1304 can be updated periodically to track the changing conditions.

Many variations exist for updating the DFAT LUT 1304 including, but not limited to a least mean squares (LMS) based technique in which a driving error signal is computed as the difference between the measured transition offset and the DFAT LUT predicted offset.

Conventional approaches to receiver design have often addressed the issue of power efficiency by reducing the number of signal samples taken per baud period. For SerDes applications, the use of two samples per baud period is common, and the use of one sample per baud period has also been achieved, but at the cost of other complexities.

Rather than reduce the sampling rate, the DFAT assisted data recovery block 316 keeps the number of samples per baud interval relatively high, and reduces the number of threshold levels per sample for power efficiency. For example, in the embodiment described earlier in connection with FIG. 3, a 1-bit ADC or slicer is used for the decision device 108.

The use of a single threshold level, such as in NRZ signaling, is common for applications having low levels of channel impairment. With the DFAT assisted data recovery block 316, the single threshold level can advantageously be used for power efficiency and yet be compatible with a greater amount of channel impairment. However, when a single threshold level is used, signal transitions should occur at a high enough level relative to the sampler threshold level to be detected by the decision device 108, such as a 1-bit ADC or slicer.

One embodiment intended for very high-speed communication applications having multiple parallel links, exhibits the following characteristics: initial register transfer level (RTL) description and logic synthesis implementation of DFAT datapath components, instantiated in silicon; initial register transfer level (RTL) description and logic synthesis implementation of DFAT configuration and adaptation mechanism, instantiated in silicon, shared among multiple DFAT datapath instantiations; when the number of parallel links is high, parallel processing of the multiple links into two or more banks of links, with each bank being served by a single configuration and adaptation mechanism; and per link (data line) mechanism to capture operational data, allowing offline software based processing. This additional feature facilitates the testing and implementation of various adaptation algorithms.

Various embodiments have been described above. Although described with reference to these specific embodiments, the descriptions are intended to be illustrative and are not intended to be limiting. Various modifications and applications may occur to those skilled in the art.

What is claimed is:

1. A method of detecting symbols of a data stream carried via a wired or optical transmission channel, the method comprising:
   (a) for each baud period of the data stream:
   (b) varying a size of a window of sliced samples based at least partly on determined values of one or more immediately prior symbols, wherein the window includes at least a portion of the samples of a baud period for the current symbol; and
   (c) determining a value for the current symbol based at least partly on one or more values within the window of sliced samples;
   wherein at least varying and determining are performed by electronic hardware.

2. The method of claim 1, further comprising:
   slicing the data stream with a single threshold level to generate the sliced samples, wherein slicing occurs at a sampling rate that is at least 4 times higher than the baud rate of the data stream;
   determining a logic state of the current symbol to be the same as that of the immediately prior symbol when none of the sliced samples in the window has a logic state that is opposite to that of the immediately prior symbol; and
   determining the logic state of the current symbol to be different from that of the immediately prior symbol when at least one sliced sample in the window has a logic state that is opposite to that of the immediately prior symbol.

3. The method of claim 1, further comprising:
   slicing the data stream with a single threshold level to generate the sliced samples, wherein slicing occurs at a sampling rate that is at least 4 times higher than the baud rate of the data stream;
   filtering the sliced samples after slicing to generate filtered samples;
   determining a logic state of the current symbol to be the same as that of the immediately prior symbol when none of the filtered samples in the window has a logic state that is opposite to that of the immediately prior symbol; and
   determining the logic state of the current symbol to be different from that of the immediately prior symbol when at least one filtered sample in the window has a logic state that is opposite to that of the immediately prior symbol.

4. The method of claim 3, wherein filtering comprises majority logic filtering.

5. The method of claim 1, further comprising:
   exclusive-ORing N pairs of previously detected adjacent symbols to generate N−1 modified symbols;
   wherein varying the size of the window of samples is based on values of the N−1 modified symbols.

6. The method of claim 1, further comprising (d) analyzing multiple windows for multiple baud periods and determining values for the multiple windows in parallel.

7. The method of claim 6, further comprising:
   (e) for each of two or more windows being processed in parallel, performing the following in parallel before a logic state of the immediately prior symbol is known:
   (f) assuming that the immediately prior symbol is a logic "1," performing:
   (g) determining a first possible outcome of the current symbol for the window to be the same as that of the assumed state of the immediately prior symbol when none of the sliced samples in the window has a logic state that is opposite to that of the assumed state of the immediately prior symbol; and
   (h) determining a second possible outcome of the current symbol for the window to be different from that of the assumed state of the immediately prior symbol when at least one sliced sample in the window has a logic state that is opposite to that of the assumed state of the immediately prior symbol;

(i) assuming that the immediately prior symbol is a logic "0," performing:

(j) determining a third possible outcome of the current symbol for the window to be the same as that of the assumed state of the immediately prior symbol when none of the sliced samples in the window has a logic state that is opposite to that of the assumed state of the immediately prior symbol; and (k) determining a fourth possible outcome of the current symbol for the window to be different from that of the assumed state of the immediately prior symbol when at least one sliced sample in the window has a logic state that is opposite to that of the assumed state of the immediately prior symbol; and (l) after the logic state of the immediately prior symbol is known, selecting from the first possible outcome, the second possible outcome, the third possible outcome, or the fourth possible outcome for determination of the current symbol based at least partly on the logic state of the immediately prior symbol.

8. The method of claim 7, further comprising repeating (a) to (l) for determination of at least the immediately prior symbol.

9. The method of claim 1, further comprising adjusting timing of slicing based at least partly on determined values of two or more immediately prior symbols.

10. The method of claim 1, wherein the size of the window is varied with reference to a lookup table, wherein the method further comprises adaptively adjusting contents of the lookup table.

11. An apparatus for detecting symbols of a data stream carried via a wired or optical transmission channel, the apparatus comprising:
a data decision memory block configured to store one or more determined values of two or more immediately prior symbols; and
a variable window processing block configured to, per baud period, select a size for a window of sliced samples based at least partly on the determined values of the two or more immediately prior symbols and to determine a value for a current symbol based at least partly on one or more values within the window of sliced samples.

12. The apparatus of claim 11, further comprising:
a slicer disposed in a signal path upstream of the variable window processing block, the slicer configured to slice soft symbols of the data stream with a single threshold level to generate the sliced samples, wherein slicer is configured to slice at a sampling rate that is at least 4 times higher than the baud rate of the data stream;
wherein the variable window processing block further comprises:
a cumulative OR circuit configured to generate a logical OR of sliced samples of the window;
a cumulative AND circuit configured to generate a logical AND of sliced samples of the window;
an output multiplexer configured to select a result from the cumulative OR circuit or from the cumulative AND circuit based on a state of an immediately prior symbol to determine a logic state of the current symbol.

13. The apparatus of claim 12, further comprising:
wherein the cumulative OR circuit comprises a plurality of OR gates having a plurality of outputs, wherein each output comprises a logical ORing of the corresponding sliced sample and earlier-in-time sliced samples of the window;
wherein the cumulative AND circuit comprises a plurality of AND gates having a plurality of outputs, wherein each output comprises a logical ANDing of the corresponding sliced sample and earlier-in-time sliced samples of the window;
wherein the variable window processing block further comprises:
a cumulative-OR multiplexer configured to select among the plurality of outputs of the cumulative OR circuit based, at least in part on the determined values of the two or more immediately prior symbols;
a cumulative-AND multiplexer configured to select among the plurality of outputs of the cumulative AND circuit based at least in part on the determined values of the two or more immediately prior symbols;
wherein the output multiplexer is configured to select between an output of the cumulative-OR multiplexer or an output of the cumulative-AND multiplexer.

14. The apparatus of claim 11, further comprising:
a slicer disposed in a signal path upstream of the variable window processing block, the slicer configured to slice soft symbols of the data stream with a single threshold level to generate the sliced samples, wherein slicer is configured to slice at a sampling rate that is at least 4 times higher than the baud rate of the data stream;
a filter disposed in the signal path between the slicer and the variable window processing block, the filter configured to filter the sliced samples to generate filtered samples;
wherein the variable window processing block further comprises:
a cumulative OR circuit configured to generate a logical OR of filtered samples of the window;
a cumulative AND circuit configured to generate a logical AND of filtered samples of the window;
an output multiplexer configured to select a result from the cumulative OR circuit or from the cumulative AND circuit based on a state of an immediately prior symbol to determine a logic state of the current symbol.

15. The apparatus of claim 14, wherein the filter comprises a majority logic filter.

16. The apparatus of claim 11, wherein the variable window processing block further comprises:
an exclusive-OR block configured to exclusive-OR N pairs of previously detected adjacent symbols to generate N−1 modified symbols;
wherein the variable window processing block is configured to vary the size of the window of samples based on values of the N−1 modified symbols.

17. The apparatus of claim 11, wherein the variable window processing block is further configured to process multiple windows for multiple baud periods in parallel.

18. The apparatus of claim 17, wherein the variable window processing block further comprises:
a plurality of DFAT pre-computation blocks configured to process multiple windows in parallel, wherein at least one DFAT pre-computation block of the plurality is configured:
to receive a window of samples;
to determine a first possible outcome of the current symbol for the window to be the same as that of a first assumed state of the immediately prior symbol when none of the sliced samples in the window has a logic state that is opposite to that of the first assumed state of the immediately prior symbol, wherein the first assumed state is a logic "1"; and to determine a second possible outcome of the current symbol for the window to be different from that of the first assumed state of the immediately prior symbol when at least one sliced sample in the window has a logic state that is opposite to that of the first assumed state of the immediately prior symbol;

to determine a third possible outcome of the current symbol for the window to be the same as that of a second assumed state of the immediately prior symbol when none of the sliced samples in the window has a logic state that is opposite to that of the second assumed state of the immediately prior symbol, wherein the second assumed state is logic "0"; and to determine a fourth possible outcome of the current symbol for the window to be different from that of the second assumed state of the immediately prior symbol when at least one sliced sample in the window has a logic state that is opposite to that of the second assumed state of the immediately prior symbol; and a feedback decision matrix configured to select from the first possible outcome, the second possible outcome, the third possible outcome, or the fourth possible outcome for determination of the current symbol based at least partly on the logic state of the immediately prior symbol after the logic state of the immediately prior symbol is determined.

19. The apparatus of claim 11, wherein the variable window processing block is further configured to provide a signal to adjust timing of the slicer based at least partly on determined values of two or more immediately prior symbols.

20. The apparatus of claim 11, wherein the variable window processing block further comprise a window control block configure to vary the size of the window with reference to a lookup table; wherein contents of the lookup table are adaptively adjusted.

21. An apparatus for detecting symbols of a data stream carried via a wired or optical transmission channel, the apparatus comprising:

means for varying a size of a window of sliced samples for each baud period of the data stream based at least partly on determined values of two or more immediately prior symbols, wherein the window includes at least a portion of the samples of a baud period for the current symbol; and means for determining a value for the current symbol based at least partly on one or more values within the window of sliced samples.

22. A method of adaptively adjusting or generating content for a lookup table for selection of one or more samples to be used for determination of a value of a symbol from a data stream, the method comprising:

determining offsets between an average transition location and actual transition locations within samples, wherein the data stream is sliced at a sampling rate that is at least 4 times higher than a baud rate of the data stream to generate the samples;

when a current determined symbol is different from the determined symbol for an immediately previous baud interval:

receiving an indication as to which previous detected symbol pattern of a plurality of previous detected symbol patterns is applicable for a current baud interval, wherein the previous detected symbol pattern comprises one or more prior symbols; and collecting offsets separately by the previous detected symbol pattern;

when the current determined symbol is the same as the determined symbol for the previous baud interval, discarding a collected offset; and modifying a value associated with the collected offset in the lookup table;

wherein at least determining, collecting, discarding, and modifying are performed by electronic hardware.

23. The method of claim 22, wherein modifying comprises computing an average arranged by the previous detected symbol pattern and storing the average in the lookup table.

24. The method of claim 22, further comprising using the previous detected symbol pattern as an address to access data in the lookup table.

25. An apparatus for adaptively adjusting or generating content for a lookup table for selection of one or more samples to be used for determination of a value of a symbol from a data stream, the apparatus comprising:

a transition offset detector configured to determine offsets that occur between an average transition location and actual transition locations within samples, wherein the data stream is sliced at a sampling rate that is at least 4 times higher than a baud rate of the data stream to generate the samples;

an offset averaging block configured to:

when a current determined symbol is different from the determined symbol for the previous baud interval:

receive an indication as to which previous detected symbol pattern of a plurality of previous detected symbol patterns is applicable for a current baud interval, wherein the previous detected symbol pattern comprises one or more prior symbols; and collect offsets separately by the previous detected symbol pattern;

when the current determined symbol is the same as the determined symbol for the previous baud interval, discard a collected offset; and a controller configured to modify a value associated with the collected offset in the lookup table.

26. The apparatus of claim 25, wherein the offset averaging block is configured to compute averages, wherein the averages are arranged by the previous detected symbol pattern, wherein a controller is further configured to store the average in the lookup table.

27. The apparatus of claim 25, wherein the previous detected symbol pattern comprises an address used to access data in the lookup table.

28. An apparatus for adaptively adjusting or generating content for a lookup table for selection of one or more samples to be used for determination of a value of a symbol from a data stream, the apparatus comprising:

means for collecting offsets, wherein the collecting offsets means is configured to:

when a current determined symbol is different from the determined symbol for an immediately previous baud interval:

receive an indication as to which previous detected symbol pattern of a plurality of previous detected symbol patterns is applicable for a current baud interval, wherein the previous detected symbol pattern comprises one or more prior symbols; and collect offsets separately by the previous detected symbol pattern; and when a current determined symbol is different from the determined symbol for an immediately previous baud interval, discard a collected offset when the current determined symbol is the same as the determined symbol for the previous baud interval; and means for modifying a value associated with the collected count offset in the lookup table.

* * * * *